UNITED STATES PATENT OFFICE.

JOSEPH RENARD, OF LYONS, FRANCE.

IMPROVED RED DYE FROM ANILINE.

Specification forming part of Letters Patent No. 29,404, dated July 31, 1860; Reissue No. 1,359, dated December 9, 1862.

DIVISION B.

*To all whom it may concern:*

Be it known that I, JOSEPH RENARD, of Lyons, Department du Rhone, Empire of France, have invented and produced a new substance or dye for dyeing or printing red colors; and I do hereby declare that the following is a true and exact description of my said invention.

The production of the red coloring-matter or dye above referred to is based upon the discovery that if aniline be heated to a temperature of from 380° to 400° Fahrenheit, together with certain chemical compounds which are either anhydrous or perfectly dry or desiccated, the mixture thus produced will be changed into a substance of such dark color that it appears to be almost black, but which, when applied in thin layers, or diluted, is transparent and of a beautiful red color. This substance, when acted upon by water, alcohol, or other spirits, or acetic acid, produces a solution of a beautiful red color, which may be fixed upon or permanently applied to fibrous material.

The substances or chemical compounds by the treatment of which aniline produces the red coloring-matter are quite numerous, but may be classified under two following groups:

| | | |
|---|---|---|
| Sulphates of<br>Nitrates of<br>Chlorates of<br>Bromates of<br>Iodates of | the base being either | Peroxide of iron.<br>Protoxide of mercury.<br>Protoxide of tin.<br>Bioxide of mercury.<br>Bioxide of tin.<br>Yellow oxide of uranium.<br>Oxide of silver. |
| Ferric<br>Mercuric<br>Stanic<br>Uranic | —— | Chloride.<br>Bromide.<br>Iodide.<br>Fluoride. |

Many of these compounds are either too rare or too expensive to be used profitably for manufacturing purposes. I therefore prefer the use of the following: bichloride of tin, bichloride of mercury, protosulphate of mercury, bisulphate of mercury, protonitrate of mercury, deutonitrate of mercury, sulphate of tin, nitrate of peroxide of iron. The chlorides have to be used in an anhydrous state, while the others may be employed in as dry a state as it is possible to obtain them.

I shall now describe the manner in which my invention is or may be performed and carried out practically. I take a vessel of any suitable form, made of glass, pottery, or enameled cast-iron, (no metallic vessel should be used,) and put into it three parts of aniline, and add two parts of either of the above-named substances or chemical compounds. This mixture I gently heat until it reaches the boiling-point, which is at about 390° or 400° Fahrenheit. I keep up the boiling for ten or fifteen minutes, and then remove the vessel from the fire. If bichloride of tin be mixed with the aniline, the reaction will take place immediately upon heating the mixture; but if either of the other compounds be used, the reaction will commence only at a comparatively high temperature, and the perfect mixture, producing a dark and opaque mass when concentrated, and a beautiful transparent red when diluted, will be formed only after boiling it from ten to fifteen minutes. This mass, when allowed to cool, is of a liquid or viscous consistency, and becomes more pasty or solid after a lapse of time, varying in length according to the season or temperature of the atmosphere. It is sold to the trade in the latter form under the name of "Fuchsiacine," from the resemblance of color produced by it to that of the fuchsia. When dissolved in one hundred and fifty parts of boiling water to one part of fuchsiacine, it constitutes a beautiful red dye. The solution should be thoroughly mixed, and then allowed to settle, or preferably passed through a filter made of cloth of close and fine texture, so that the insoluble portions, which mainly consist of the metallic base, may be retained in the filter. This solution is employed like any other dye; but care should be taken not to use any mineral acids as a mordant, such acids having a destructive effect on the color. Organic acids—such as tartaric acid—should be used exclusively. With silk and wool no mordant is required to fix the solution of fuchsiacine. Cotton, however, will not allow of its being fixed without being for this purpose impregnated with albumen. The watery solution of fuchsiacine not being strong enough to answer the purpose of printing muslin or other stuffs, I dissolve the fuchsiacine in concentrated acetic acid, using three parts of the latter to one of the former. This solution should be effected in the cold way, as heat affects or tarnishes the brilliancy of the color. The solution prepared in this way will be completed in less than twelve hours. It is then diluted with water until the desired shade of color is produced. I then allow it to settle for about one or two hours and filter it. The solution thus obtained is thickened in the usual manner practiced with other colors for printing textile fabrics. The coloring-matter or fuchsiacine obtained by the action of aniline upon the several compounds or substances above referred to is by no means chemically pure, although sufficiently so to answer the requirements of manufacture. To obtain this matter in a perfectly pure state, or nearly so, it is necessary to boil the product for about one-quarter of an hour in from sixty to eighty parts of water, after which it is to be filtered and allowed to settle. The coloring-matter, being more soluble when warm than when cold, will, upon being cooled, subside in the form of minute crystals of green color and metallic luster. Fuchsiacine in its pure state presents the following properties: It is soluble in water, but more so at a high temperature than at a low temperature. It is readily dissolved in alcohol, in spirits of wood, and acetic acid, but is insoluble in ether. The watery solution of the pure fuchsiacine is precipitated by the addition of certain salts, such as the chlorides of earthy and alkaline metals, chloride of mercury, alkaline tartrates, &c. The alcoholic solution diluted in double its volume of ether precipitates the coloring-matter in the shape of microscopic crystals of green color and metallic luster, resembling gold. All mineral acids, and most of the principal organic acids, with the exception of acetic acid, unite and combine with the alcoholic solution, discoloring it. If the acid in the solution be neutralized by the addition of soda, potash, or other alkaline substance, the coloring-matter will be liberated and again give the liquid its red color.

What I claim as my invention is—

The new substance or red dyeing-matter produced by subjecting aniline and a metallic salt, or the equivalent thereof, to a high temperature, substantially as described.

JOSEPH RENARD.

Witnesses:
LOUIS W. VIOLLIER,
BIRON.